United States Patent
Johnson (10) Patent No.: US 12,420,450 B2
(45) Date of Patent: Sep. 23, 2025

(54) CONTAINERIZED CONCRETE BATCH PLANT

(71) Applicant: IP HOLDING COMPANY LLC, Miami Beach, FL (US)

(72) Inventor: Neal Johnson, Miami Beach, FL (US)

(73) Assignee: IP HOLDING COMPANY LLC, Miami Beach, FL (US)

( * ) Notice: Subject to any disclaimer, the term of this patent is extended or adjusted under 35 U.S.C. 154(b) by 0 days.

(21) Appl. No.: 17/836,787

(22) Filed: Jun. 9, 2022

(65) Prior Publication Data
US 2022/0297346 A1 Sep. 22, 2022

Related U.S. Application Data

(63) Continuation-in-part of application No. 16/752,203, filed on Jan. 24, 2020.

(51) Int. Cl.
*B28C 9/04* (2006.01)
*B28C 5/08* (2006.01)
*B28C 9/00* (2006.01)

(52) U.S. Cl.
CPC .......... *B28C 9/0454* (2013.01); *B28C 5/0818* (2013.01); *B28C 9/006* (2013.01); *B28C 9/0481* (2013.01)

(58) Field of Classification Search
CPC ....... B28C 5/06; B28C 5/0875; B28C 7/0418; B28C 7/163; B28C 5/1215; B28C 7/0413; B28C 5/0893; B28C 5/1238; B28C 5/16; B28C 7/02; B28C 5/08; B28C 5/0806; B28C 5/1253; B28C 9/0454; B28C 5/0818; B28C 9/006; B28C 9/0481; B28C 5/146;
(Continued)

(56) References Cited

U.S. PATENT DOCUMENTS

| 3,572,380 A | * | 3/1971 | Jackson et al. | ......... E04G 21/04 137/899 |
| 4,067,595 A | * | 1/1978 | Vigerie | .................. B66C 23/80 280/766.1 |

(Continued)

FOREIGN PATENT DOCUMENTS

FR 2832349 * 5/2003
WO 91/08845 6/1991

*Primary Examiner* — Charles Cooley
(74) *Attorney, Agent, or Firm* — DLA PIPER LLP (US)

(57) ABSTRACT

A containerized concrete batch plant is disclosed, comprising a container configured to contain a concrete batch plant to permit the transportation of the concrete batch plant. The concrete batch plant comprising one or more aggregate storage silos to receive a plurality of concrete elements. The one or more aggregate storage silos pour the concrete elements onto a conveyor based on quantity determination by a computer via a deductive scale. The conveyor transfers the concrete elements to a two-shaft mixer. An auger-fed hopper has an auger that is directly exposed to the contents inside the two-shaft mixer and transfers the contents inside the two-shaft mixer into the auger-fed hopper. A concrete pump has access to the auger-fed hopper and pumps the concrete inside the auger-fed hopper into a concrete output hose with a concrete output opening. A knuckle crane and/or hydraulic arms holds supersacks above the aggregate storage silos and the two-shaft mixer.

9 Claims, 9 Drawing Sheets

(58) Field of Classification Search
CPC ..... B28C 7/06; E04G 21/025; E04G 21/0436;
E04G 21/10; B01F 5/0473; B01F 5/048;
B01F 5/0611; B01F 5/0618; B01F
2005/0091; B01F 2005/0636; B01F
25/3141; B01F 25/31423; B01F 25/4311;
B01F 25/4316; B01F 25/431971; B01F
2025/931; B01F 35/2202; B01F 23/53;
B01F 2035/99; B01F 35/00; B01F 35/20;
B01F 35/2111; B28B 1/16; C04B
2111/00146; C04B 40/0028; E04F 21/24;
E04F 15/12; E04F 21/08; E04F 21/248;
E04F 21/02; B29C 67/242; Y02W 30/91;
B66C 23/04
USPC ...................................................... 366/11, 66
See application file for complete search history.

(56) References Cited

U.S. PATENT DOCUMENTS

| | | | | | |
|---|---|---|---|---|---|
| 4,130,134 | A | * | 12/1978 | Castle | E04G 21/04 222/527 |
| 4,298,288 | A | * | 11/1981 | Weisbrod | B28C 9/0454 366/11 |
| 4,479,750 | A | * | 10/1984 | Johnson, Jr. | B66C 3/16 280/765.1 |
| 4,538,916 | A | * | 9/1985 | Zimmerman | B28C 9/0463 366/186 |
| 4,548,507 | A | * | 10/1985 | Mathis | B28C 9/00 366/186 |
| 4,579,459 | A | * | 4/1986 | Zimmerman | B28C 9/0463 366/186 |
| 4,601,629 | A | * | 7/1986 | Zimmerman | B28C 9/0463 414/528 |
| 4,781,466 | A | * | 11/1988 | Zimmerman | B28C 9/0463 366/50 |
| 4,922,463 | A | * | 5/1990 | Del Zotto | B28C 9/0463 366/186 |
| 5,044,819 | A | * | 9/1991 | Kilheffer | E01C 19/46 366/156.1 |
| 5,120,180 | A | * | 6/1992 | Egan | E02F 9/022 414/394 |
| 5,354,127 | A | * | 10/1994 | Del Zotto | B01F 27/725 366/186 |
| 5,486,047 | A | * | 1/1996 | Zimmerman | B28C 9/0463 198/860.3 |
| 5,551,776 | A | * | 9/1996 | Zimmerman | B28C 5/4251 193/6 |
| 5,590,976 | A | * | 1/1997 | Kilheffer | G01G 19/08 366/8 |
| 7,156,603 | B2 | * | 1/2007 | Marcotte | B61D 47/00 414/339 |
| 2009/0171595 | A1 | * | 7/2009 | Bonilla Benegas | B28C 5/422 702/41 |
| 2009/0177313 | A1 | * | 7/2009 | Heller | B28C 9/049 700/214 |
| 2010/0135101 | A1 | * | 6/2010 | Lepper | B28C 7/0413 141/250 |
| 2015/0165393 | A1 | * | 6/2015 | Schuster | B28C 7/12 366/1 |
| 2016/0068374 | A1 | * | 3/2016 | Baumann | B63B 27/10 248/404 |
| 2016/0311612 | A1 | * | 10/2016 | Ozinga | B28C 7/049 |
| 2017/0183152 | A1 | * | 6/2017 | Villiger | B66C 23/16 |
| 2020/0276731 | A1 | * | 9/2020 | Igo | B28C 9/0454 |
| 2021/0229322 | A1 | * | 7/2021 | Johnson | B28C 9/0409 |
| 2021/0332584 | A1 | * | 10/2021 | Johnson | E04B 1/3431 |
| 2022/0297346 | A1 | * | 9/2022 | Johnson | B28C 5/0818 |

* cited by examiner

FIG. 9

CONTAINERIZED CONCRETE BATCH PLANT

CROSS-REFERENCE TO OTHER APPLICATIONS

This application is a Continuation-In-Part Application of and claims the benefit of prior co-pending Non-Provisional patent application Ser. No. 16/752,203, filed on Jan. 24, 2020, which is incorporated herein by reference in its entirety.

TECHNICAL FIELD

The embodiments relate to transportable concrete batch plants and, more specifically, relate to containerized concrete batch plants.

BACKGROUND

Concrete is a composite material composed of fine and coarse aggregate bonded together with a fluid cement that hardens over time. Many types of concrete exist, including cementitious and non-cementitious types, each having different methods of binding aggregate together. Due to its vast building applications, concrete is one of the most frequently used building materials. In fact, its usage worldwide is, ton for ton, twice that of steel, wood, plastics, and aluminum combined.

A concrete plant, also known as a batch plant, includes equipment that combines various ingredients to form the concrete. Inputs include water, air, admixtures, sand, aggregate (e.g., rocks, gravel, etc.) fly ash, silica fume, slag, Portland cement, or cement paste. The batch plant will also include various components to perform various tasks, including mixers, cement batchers, aggregate batchers, conveyors, radial stackers, aggregate bins, cement bins, heaters, chillers, silos, batch plant controls, scales, and dust collectors.

Portable batch plants are a productive, reliable, and cost-effective means to producing batches of concrete which allow the user to batch concrete in various locations. These systems are often used for temporary site projects. However, portable batch plants are also useful in locations where the equipment size is a factor, or the required production rate is low. Similarly, these systems are employed in locations where the concrete requirements of the job site are not feasibly covered by the inbound transport of concrete mixed at an offsite location.

For this reason, many construction companies utilize a transportable mixing plant that is erected at a jobsite to produce concrete on-site. The transportable mixing plant must then be deconstructed and arranged for transport to the next jobsite at which it is required. This process results in the use of large amounts of resources (in materials, consumables, time, and personnel) to assemble and transport the mixing plant.

SUMMARY OF THE INVENTION

This summary is provided to introduce a variety of concepts in a simplified form that is further disclosed in the detailed description. This summary is not intended to identify key or essential inventive concepts of the claimed subject matter, nor is it intended for determining the scope of the claimed subject matter.

The present embodiments disclose a containerized concrete batch plant comprising a container configured to contain a concrete batch plant to permit the transportation of the concrete batch plant. The concrete batch plant comprises one or more aggregate storage silos to receive a plurality of concrete elements. Deductive scales measure the amount of concrete elements poured from the one or more aggregate storage silos onto a conveyor. The conveyor transfers the concrete elements to a two-shaft mixer. A hopper receives the concrete from the two-shaft mixer.

The containerized concrete batch plant allows for construction companies, concrete companies, or like enterprises to easily transport a concrete batch plant between jobsites without undue assembly and disassembly, thus saving resources. The containerized concrete batch plant is self-contained within a single container which conforms to ISO standards, at least while in a transport configuration, and includes a modified container which allows for shipping and full operation of the concrete batch plant.

In one aspect, the hopper is an auger-fed hopper that has an auger and a hopper, the auger extending from the hopper through under the two-shaft mixer. The auger is directly and fluidly connected and exposed to the underside of the two-shaft mixer and to the concrete elements inside the two-shaft mixer when a mixer underside door between the auger and the two-shaft mixer is opened by a mixer underside door actuator. The auger of the auger-fed hopper transfers the concrete, formed from the plurality of concrete elements, from the two-shaft mixer to inside the hopper of the auger-fed hopper. A two-piston pump propels or pumps the concrete out of the auger-fed hopper into a concrete output hose with a concrete output opening.

In one aspect, the hopper is a conveyor-fed hopper. A mixer-to-hopper conveyor transfers concrete poured from the two-shaft mixer to the hopper.

In one aspect, the concrete in the hopper is pumped by a dual piston pump into a concrete output hose.

In one aspect, the containerized concrete batch plant further comprises one, two, or more sealed belly tanks having a plurality of partitions to facilitate the storage of various resources comprising water, fuel, and a plurality of concrete elements and admixtures.

In one aspect, the auger is disposed within a housing having a removeable side plate to facilitate cleaning of the auger. The housing is dimensioned and positioned to be connected to the two-shaft mixer such that the auger is both enclosed by the housing and exposed to the underside of the two-shaft mixer.

In one aspect, the containerized concrete batch plant further comprises a knuckle crane.

In one aspect, the containerized concrete batch plant further comprises a lifting platform under the knuckle crane.

According to one or more aspects, a containerized concrete batch plant comprises a container and a concrete batch plant inside the container, the concrete batch plant comprising one or more storage silos to receive a plurality of concrete elements for transfer to a mixer; an auger-fed hopper comprising an auger fluidly connected to the mixer drive to transfer the plurality of concrete elements from the mixer into the auger-fed hopper; and a concrete pump to pump concrete out of the auger fed hopper.

In one aspect, the containerized concrete batch plant further comprises a vibrator positioned to vibrate at least one of the one or more storage silos.

In one aspect, the containerized concrete batch plant further comprises a crane dimensioned to reach one or more of the plurality of concrete elements when the one or more of the plurality of concrete elements are placed around the container or within an area around the container.

In one aspect, the containerized concrete batch plant further comprises a platform positioned under the crane to lift the crane at least up to the height of the container.

In one aspect, the containerized concrete batch plant further comprises a computer or batch plant computing system in operable communication with a network. The computer or batch plant computing system has a memory storing computer-executable instructions, a processor in communication with the memory and configured to execute the computer-executable instructions, wherein the computer-executable instructions are executed by the processor to cause the batch plant computing system to: receive information from one or more deducting scales of the one or more storage silos; execute batch programs; and determine at least one from a list comprising: global positioning information, equipment status information, batching programs information, and performance information.

In one aspect, the containerized concrete batch plant further comprises a global positioning device that sends global positioning information to a batch plant computing system; wherein the batch plant computing system communicatively connects to a remote computing system to send to the remote computing system at least one from the list comprising: global positioning information, equipment status information, batching programs information, and performance information.

According to one or more aspects, a process for generating concrete comprises tracking location, status, or performance of the containerized concrete batch plant; transferring a containerized concrete batch plant to a desired position; connecting external hoses to the containerized concrete batch plant; adding aggregates to the containerized concrete batch plant; determining an engineered mix design; and generating a concrete batch.

In one aspect, the container is constructed having ISO standards.

BRIEF DESCRIPTION OF THE DRAWINGS

A more complete understanding of the present invention and the advantages and features thereof will be more readily understood by reference to the following detailed description when considered in conjunction with the accompanying drawings wherein.

DETAILED DESCRIPTION

The specific details of the single embodiment or variety of embodiments described herein are to a system and method of use. Any specific details of the embodiments are used for demonstrative purposes only and no unnecessary limitations or inferences are to be understood therefrom.

Before describing in detail exemplary embodiments, it is noted that the embodiments reside primarily in combinations of components related to the system and method. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second", "top" and bottom", and the like, may be used solely to distinguish one entity or element from another entity or element without necessarily requiring or implying any physical or logical relationship or order between such entities or elements.

As used herein, the term "concrete element" may include any concrete material including fine and course aggregates, fluid cements (of any type including lime-based cement binder, lime putty, hydraulic cements such as aluminate cement, portland cement, and/or the like). Concrete elements may also include non-cementitious types of concrete with various forms of binding agents. Concrete elements include materials not yet found, discovered, invented, or known to be useful for creating concrete or any sub-material or subcomponent of concrete.

As used herein, the term "resources" may include various resources utilized by a concrete batch plant and the embodiments herein including water, fuel sources, and other consumables which may or may not be directly used in concrete.

In general, the aspects described herein relate to a containerized concrete batch plant which is sufficient to form concrete in various locations while being contained within a portable container having standard International Organization for Standardization (ISO) dimensions. The container is suitable for transportation by ship, rail, and truck to a location for deployment. The containerized batch plant is configured to be reusable in various locations without undue assembly and deconstruction between each location. The containerized concrete batch plant comprises a plurality of stabilization outriggers, a knuckle crane, two-shaft mixer, an auger-fed hopper, onboard concrete pump, one or more concrete elements storage silos, computer controlled actuators for dispensing concrete elements from the one or more storage silos onto a conveying system to an aggregate dispensing opening of the two-shaft mixer, concrete pumps, steel concrete pump tubing, concrete hoses, a concrete pump hose (or concrete output hose), an onboard generator, fuel tank, and an onboard computer control system (or computer), in addition to standard components included in a concrete batch plant known to those skilled in the arts.

Figure 1:
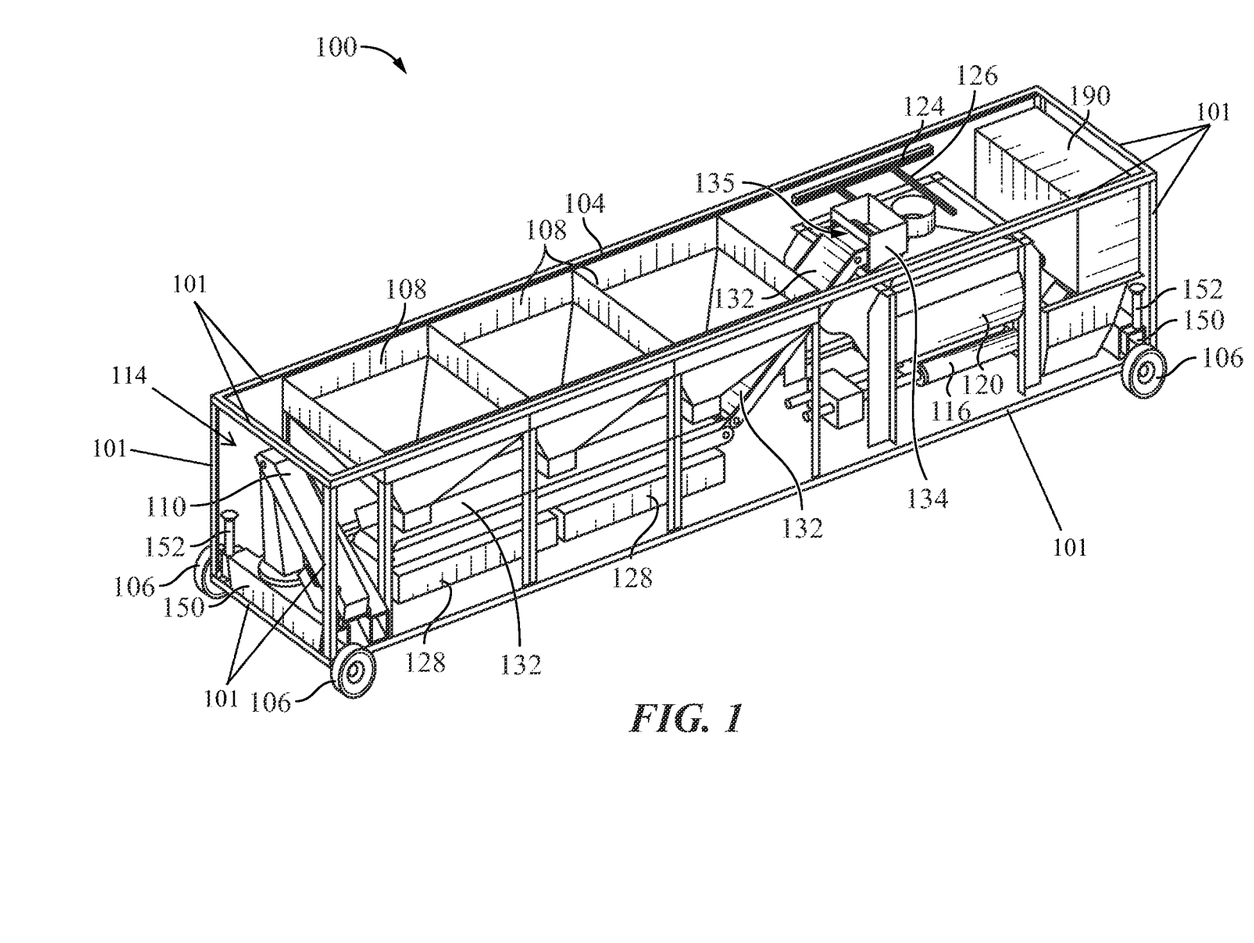
FIG. 1 illustrates a perspective view of the containerized concrete batch plant in a transport/storage configuration, according to some embodiments.
Figure 2:
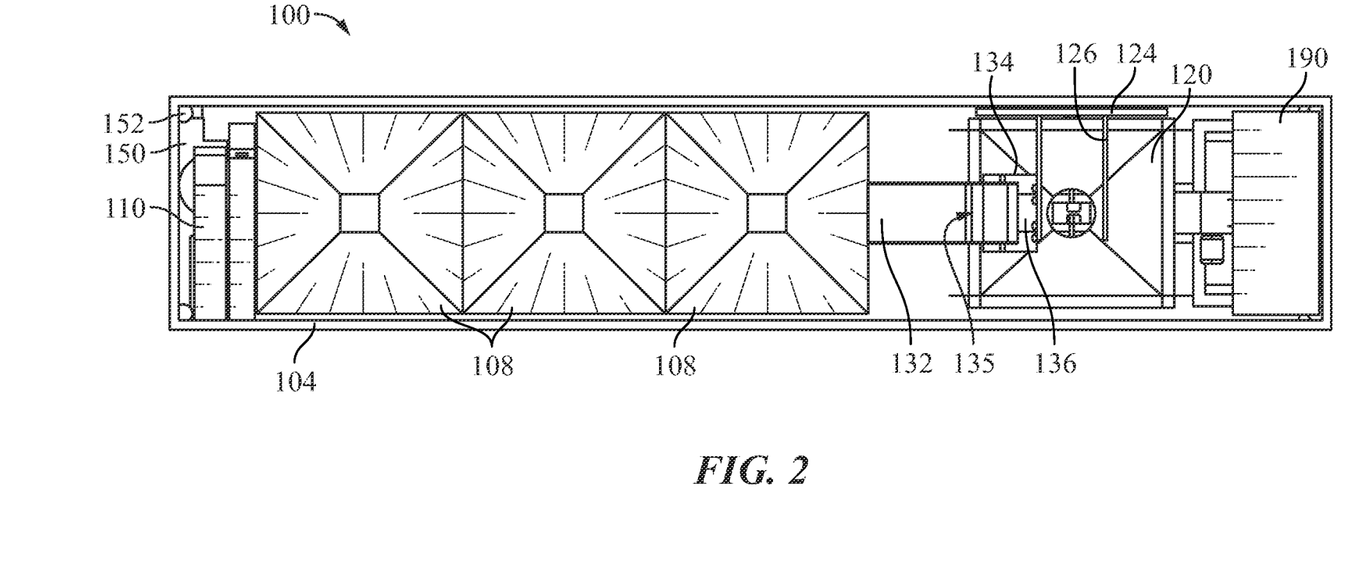
FIG. 2 illustrates a top view of the containerized concrete batch plant, according to some embodiments.

FIGS. 1 through 9 illustrate different views of a containerized concrete batch plant 100. FIGS. 1 and 2 illustrate the containerized concrete batch plant 100 in a storage configuration wherein the components are contained within a single container 104 to comply with ISO shipping standards. FIG. 1 shows an isometric perspective view of the concrete batch plant 100 and FIG. 2 shows a top view of the concrete batch plant 100. The containerized concrete batch plant 100 is provided in the container 104 which is configured to meet ISO standards and is capable of being shipped to jobsites and anywhere in the world by truck, rail, shipping vessel, any form of transportation vehicle or vessel that can carry a container meeting ISO standards, and/or the like. The container may be structurally modified to facilitate the batching of concrete via the containerized concrete batch plant. For example, panels (not shown) mounted on structural support members 101 can cover the top, bottom, and sides of the container 104. The panels may be removeable (not shown) to allow for access to the various components of the containerized concrete batch plant 100. The container 104 houses the various components of the containerized concrete batch plant 100 which is utilized to form concrete. For example, a knuckle crane 110 is housed in a sub-compartment 114. One or more aggregate storage silos 108 are provided to store various elements which are used to form the concrete such as cement (or any kind of binding agent), water, one or more aggregates such as sand, gravel, and/or the like. The concrete elements are transferred from the aggregate storage silos 108 to a two-shaft mixer 120. The container 104 also houses a concrete dual piston pump 116. Sealed belly tanks 128 are utilized for water storage, fuel storage, and storage of other cement elements (such as Portland cement, fly ash, or other additives).

The container 104 has a plurality of wheels 106. In operation, the plurality of wheels 106 are located under the container 104. In storage configuration and/or in non-moving operation, the plurality of wheels 106 are inside the container 104. To change the plurality of wheels 106 back and forth between operation configuration and non-moving configuration (and/or storage configuration), the plurality of wheels are removed from inside the container 104 and attached under the container 104 or removed from under the container 104 and attached or placed inside the container 104. According to one or more aspects, the wheels are motorized to move the whole containerized concrete batch plant 100.

The aggregate storage silos 108 dispense their contents onto a conveyor 132 below the aggregate storage silo 108 based on weight, volume, density, and/or amount calculated by a computer. Each one of the one or more aggregate storage silos 108 has a deductive scale, an output door, and a silo actuator that opens and/or closes the output door (not shown). The computer uses deductive scaling to measure the weight and/or the amount of contents poured from the aggregate storage silos 108 onto the conveyor 132. The deductive scales and/or the silo actuators are wired and/or wirelessly connected to the computer. The deductive scales send a deductive scale signal to the computer. For material that has been flowing out of the corresponding aggregate storage silo 108, the corresponding deductive scale signal carries information about the type of material, the amount of material (including weight, volume, and/or density), the amount of time material has been pouring onto the conveyor 132, and/or the like. The computer receives the deductive scale signal from each deductive scale. According to one or more aspects, for material that has been flowing out of the corresponding aggregate storage silo 108, the computer calculates or determines, based on the deductive scale signal, the type of material, the amount of material (including weight, volume, and/or density), the amount of time material has been pouring onto the conveyor 132, and/or the like. The silo actuators open, close, and/or control the opening size (and thus the flow rate of material) of the output door of each corresponding aggregate storage silo 108 (not shown). For each silo actuator, the computer generates a silo actuator control signal based on the deductive scale signal, the information in the deductive scale signal, and/or one or more determinations made by the computer based on the deductive scale signal and/or the information in the deductive scale signal. For example, if the container 104 has three aggregate storage silos 108, then the computer receives up to three distinct deductive scale signals (it is possible that less than three aggregate storage silos 108 are in operation), generates up to three distinct silo actuator control signals, and sends each of the one or more distinct silo actuator control signals to the corresponding silo actuator. As another example, if there are five aggregate storage silos 108 but only four are in use and the four aggregate storage silos 108 that are in use each has a distinct deductive scale signal sent to the computer, the computer receives the four distinct deductive scale signals, generates a first, second, third, and fourth silo actuator control signals, and sends each of the first, second, third, and fourth silo actuator control signals to the corresponding silo actuator. The computer sends the corresponding silo actuator control signal to each silo actuator to control the opening and closing of each corresponding output door. The conveyor 132 feeds the material(s) poured from the aggregate storage silos 108 (concrete inputs) into the two-shaft mixer 120 to mix the ingredients and form wet concrete, as further discussed below.

According to one or more aspects, the container 104 has one, two, three, or more than three aggregate storage silos 108. The one or more aggregate storage silos 108 are provided to store various elements which are used to form the concrete such as cement, sand, and aggregates. According to one or more aspects, each of the one or more aggregate storage silos 108 may be comprised of a plurality of compartments (not shown) to store the various elements utilized during the concrete formation process. One skilled in the arts will readily understand that various configurations of aggregate storage silos may be employed depending on the application of the containerized concrete batch plant 100 at a particular jobsite.

Each of the one or more aggregate storage silos 108 has a vibrator (not shown). Each vibrator is mechanically connected to the corresponding aggregate storage silo 108 (for example, mechanically connected to the nozzle of an aggregate storage silo 108). Each vibrator is wired and/or wirelessly connected to the computer. The vibrators generate mechanical vibrations which transfer to the corresponding aggregate storage silos 108. The vibrations loosen material inside each of the corresponding one or more aggregate storage silos 108. Each vibrator can generate a spectrum of vibrations. Vibrations can differ from each other in terms of amplitude, intensity, strength, duration, pauses, waveform, wavelength, frequency, phase, and/or the like. According to one or more aspects, each of the one or more aggregate storage silos 108 has a plurality of vibrators strategically positioned to cause different vibrations. In operation, the computer determines whether each of the one or more aggregate storage silos 108 needs vibration and/or the type of vibration required based on the deductive scale signal, the type of material, the amount of material (including weight, volume, and/or density), the amount of time material has been pouring onto the conveyor 132, the number of and/or the location of the vibrators with respect to each of the one or more aggregate storage silos 108, the shape and/or the type of material that composes the structure of the corresponding aggregate storage silo 108, the amount of material left in the corresponding aggregate storage silo 108, and/or the like. The computer generates a distinct vibrator control signal for each vibrator based on the determination of whether each of the one or more aggregate storage silos 108 needs vibration and/or the type of vibration required. According to one or more aspects, the computer generates a distinct vibrator control signal for each vibrator based on the deductive scale signal, the type of material, the amount of material (including weight, volume, and/or density), the amount of time material has been pouring onto the conveyor 132, the number of and/or the location of the vibrators with respect to each of the one or more aggregate storage silos 108, the shape and/or the type of material that composes the structure of the corresponding aggregate storage silo 108, the amount of material left in the corresponding aggregate storage silo 108, and/or the like. The computer sends the corresponding vibrator control signal to the corresponding vibrator.

The concrete elements are transferred from the one or more storage silos 108 to the two-shaft mixer 120 via a conveyor 132. The conveyor 132 extends under each of the one or more aggregate storage silos 108 and angles upward to a mixer feeding chute 134. The conveyor 132 extends into the mixer feeding chute 134 through a side aperture 135. The conveyor 132 receives the aggregates from the one or more aggregate storage silos 108 and moves the aggregates through the conveyor 132, up to the mixer feeding chute 134 through the side aperture 135, with the aggregates falling directly into the two-shaft mixer 120 through a bottom aperture 136 (shown in FIG. 2) of the mixer feeding chute 134. The bottom aperture 136 is closed by an actuator controlled input door (not shown), which is opened by the computer when the conveyor 132 is moving and/or when materials will go into the two-shaft mixer 120. Otherwise, and particularly when the two-shaft mixer is mixing materials, the actuator controlled input door is closed by the computer, shutting the bottom aperture 136, which avoids dust and/or materials from splattering out of the two-shaft mixer 120 during mixing operations. The conveyor 132 is controlled by the computer by changing the conveyor speed, conveyor direction, and conveyor position depending on the particular concrete element(s) being conveyed and their amount and/or volume.

Figure 3:
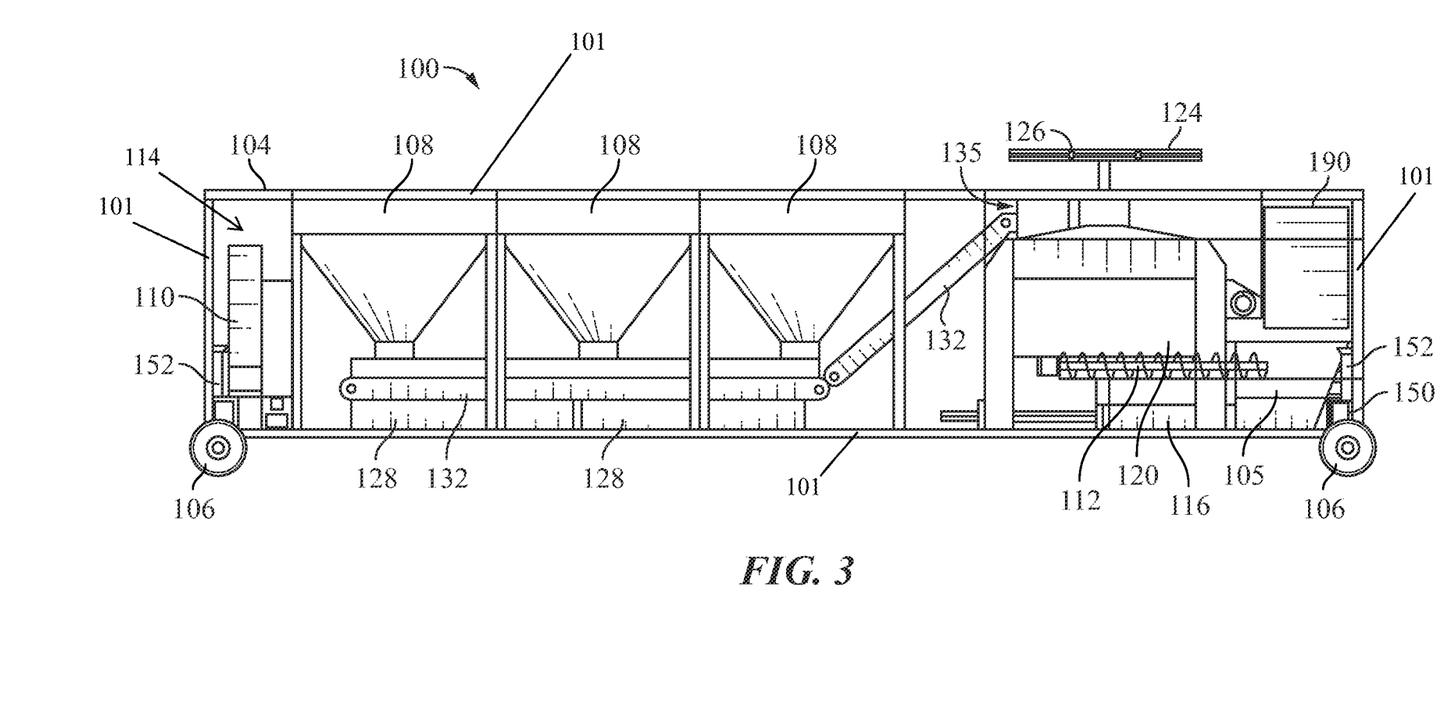
FIG. 3 illustrates a side view of the containerized concrete batch plant in an operational configuration, according to some embodiments.

FIG. 3 illustrates a sideview of the containerized concrete batch plant 100. According to one or more aspects, the containerized concrete batch plant 100 has one or more hydraulically controlled support arms 124 with at least one of the arms directly above the two-shaft mixer 120. In FIG. 3, there is one hydraulically controlled support arm 124 directly above the two-shaft mixer 120 and elevated via a hydraulic mechanism. In FIGS. 1 and 2, the one hydraulically controlled support arm 124 is receded as in storage configuration.

In reference to FIG. 3, an auger fed hopper comprises an auger 112 and a hopper 105. The auger 112 extends from the underside of the two-shaft mixer 120 to the hopper 105. According to one or more aspects, the auger 112 extends into the hopper 105 through a hole to outside of the hopper 105. The auger is enclosed in a housing while the two-shaft mixer 120 is fluidly connected to the auger 112 directly, such that the auger 112 has direct fluid access to the contents of the two-shaft mixer 120. Thus, there are no spouts, hoses, conveyors, and/or pumps that take the contents of the two-shaft mixer 120 to the auger 112. Likewise, there are no spouts, hoses, conveyors, and/or pumps that move the contents of the two-shaft mixer 120 into the hopper 105. The auger 112 moves the contents from the two-shaft mixer 120 to the hopper 105 directly as the auger 112 rotates. This saves materials (hoses, pumps, spouts, and/or the like) that would be otherwise necessary for contents to exit the two-shaft mixer 120. It also saves travel time for the cement or other contents of the two-shaft mixer 120 to reach the hopper 105 and then pumped out of the containerized concrete batch plant 100.

Note that if the two-shaft mixer 120 receives and has yet to mix cement aggregates, at least some amount of those cement aggregates would escape the two-shaft mixer 120 and go directly into the auger 112. To prevent unmixed aggregates from reaching the auger 112, an auger door (not shown) is shaped and/or dimensioned to open and close the fluid connection between the two-shaft mixer 120 and the auger 112. The auger door is opened and closed by an auger door actuator (not shown). The auger door actuator is wired and/or wirelessly connected to the computer. The computer determines whether to open and/or close the auger door based on whether the materials in the two-shaft mixer 120 are appropriately mixed and/or ready for delivering out of the two-shaft mixer 120. The computer generates an auger door actuator control signal based on the determination of whether to open and/or close the auger door, whether the materials in the two-shaft mixer 120 are appropriately mixed, and/or whether the materials in the two-shaft mixer 120 are ready for delivering out of the two-shaft mixer 120.

According to one or more aspects, a conveyor fed hopper (not shown) comprises a hopper 105 and a mixer-to-hopper conveyor (not shown) that extends from the hopper 105 through the underside of the two-shaft mixer 120 (not shown). According to one or more aspects, the mixer-to-hopper conveyor is enclosed in a housing and positioned under an underside mixer door of the two-shaft mixer 120. The contents inside the two-shaft mixer 120 fall on the mixer-to-hopper conveyor when an underside mixer door opens (not shown). The underside mixer door has an actuator (not shown) that is controlled by the computer. The computer generates an underside mixer door actuator signal to open, close, and/or partially open then underside mixer door to change the rate at which content from the two-shaft mixer 120 moves through the underside mixer door (not shown). The mixer-to-hopper conveyor has a mixer-to-hopper conveyor activator (not shown) that is controlled by the computer. The computer generates a mixer-to-hopper conveyor activator signal to start, stop, and/or change the speed of the mixer-to-hopper conveyor to change the rate at which content from the two-shaft mixer 120 moves on the mixer-to-hopper conveyor and into the hopper 105 (not shown).

Figure 4:
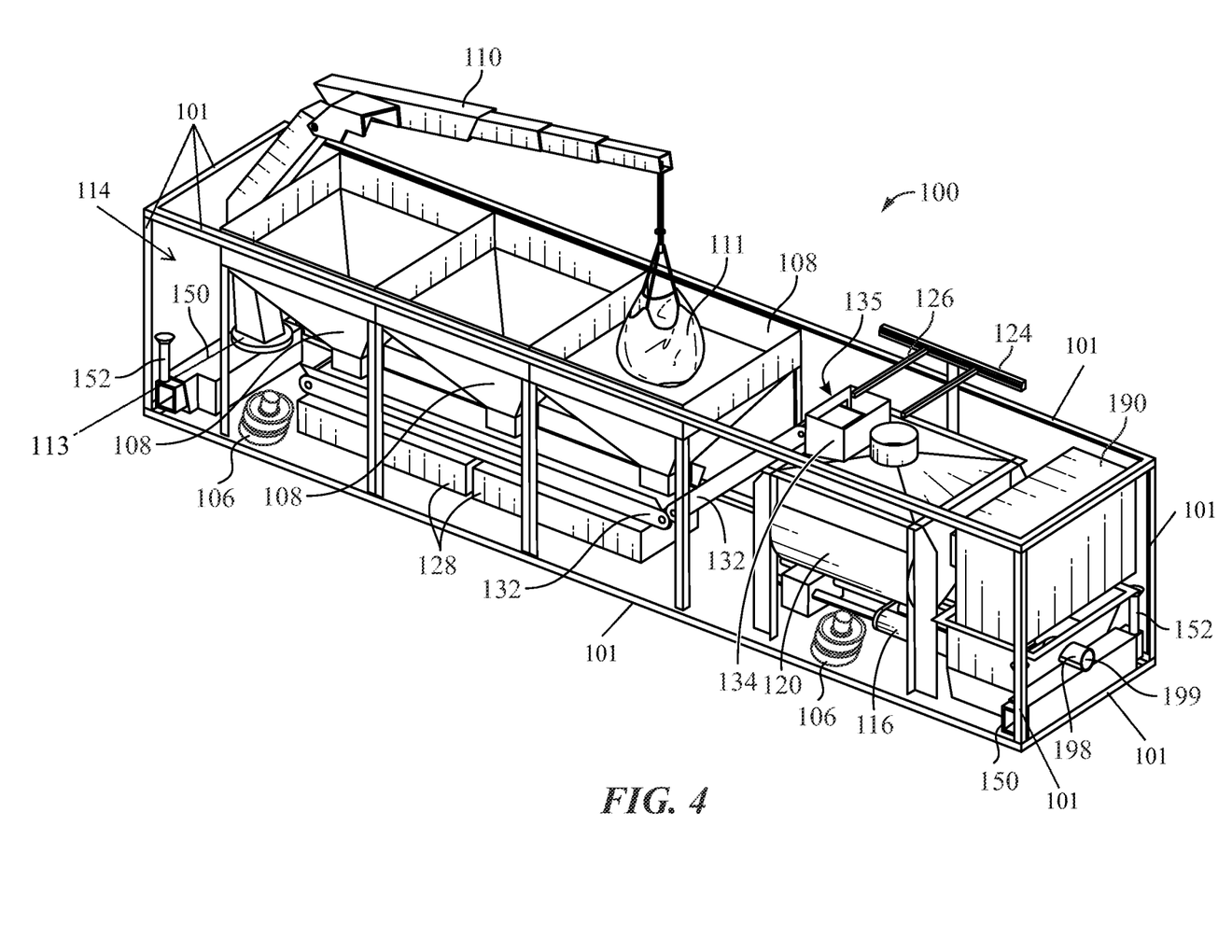
FIG. 4 illustrates a perspective view of the containerized concrete batch plant in an operational configuration, according to some embodiments.
Figure 5:
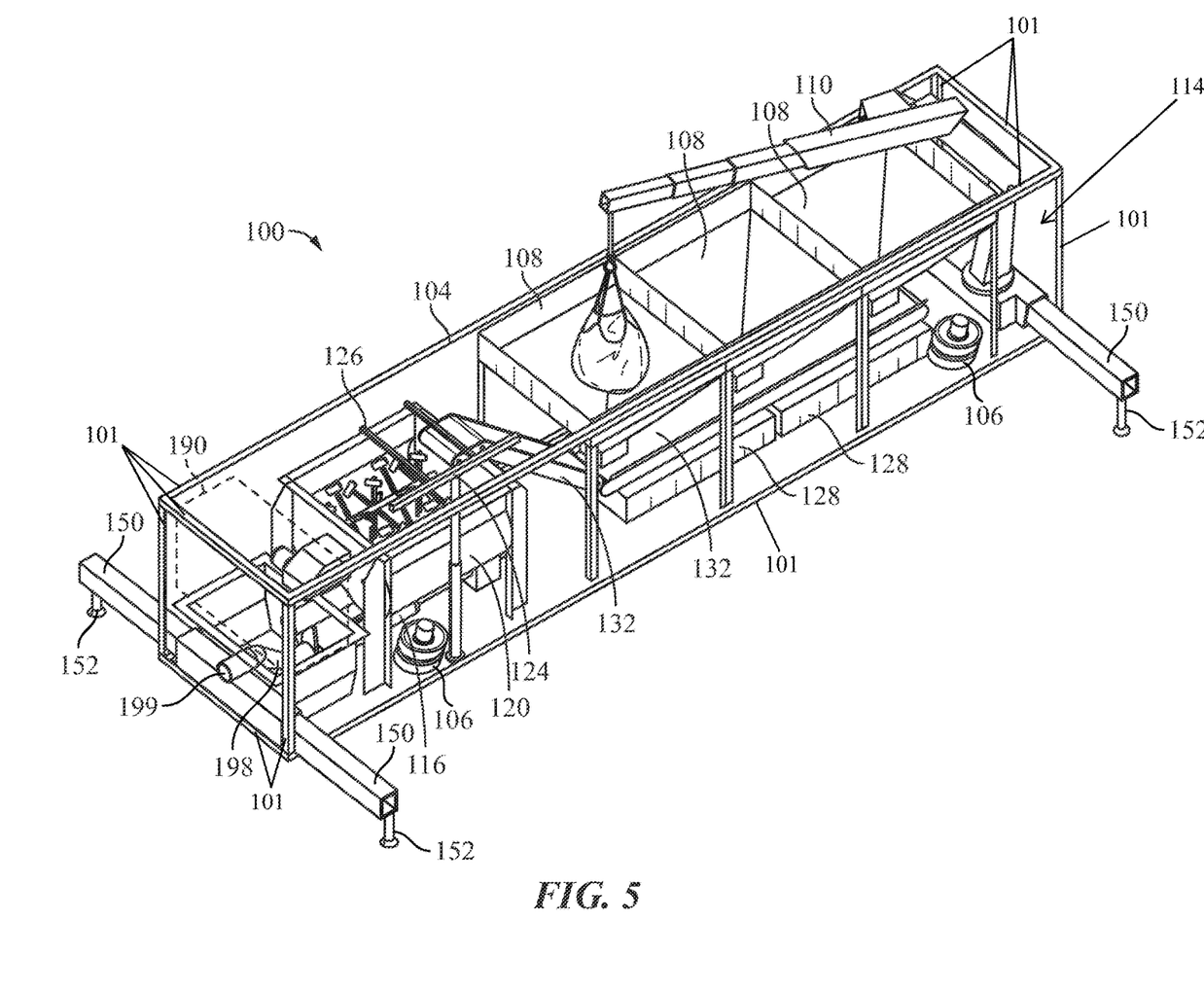
FIG. 5 illustrates a perspective view of the containerized concrete batch plant in an operational configuration, according to some embodiments.

According to one or more aspects, the auger 112 includes a housing having a removeable side plate to facilitate cleaning. The concrete dual piston pump 116 pumps the concrete inside the hopper 105 out through a concrete output hose 198 with a concrete output opening 199, as shown in FIGS. 4 and 5. This allows for the direct dispatching of concrete on a jobsite from the containerized concrete batch plant 100. According to one or more aspects, the concrete may be hard-piped into another vertical concrete pump, which is particularly useful wherein the jobsite is a high-rise structure or a similarly tall structure having multiple levels in which concrete is poured. This allows for the direct dispensing of concrete rather than first dispensing the concrete into another vehicle or delivery system.

A power plant 190 provides energy to the various components of the containerized concrete batch plant 100. The power plant 190 uses fuel, diesel, solar power, wind power, and/or the like to generate electricity. According to one or more aspects, the containerized batch plant 100 and/or one or more of the various components of the concrete batch plant 100 is powered by local energy sources and/or by the power plant 190. According to one or more aspects, the power plant 190 has any required circuits and electrical components to receive power from any power source (such as different connections and electronic components to be able to receive two-phase or three-phase power, AC and/or DC power, electricity at any voltage and/or frequency standard, and/or the like) and transform that received power into voltage, current, frequency, energy, and/or phase parameters (and any other parameters) that are required by the different parts and components of the containerized concrete batch plant 100. Note that the voltage, current, frequency, energy, and/or phase parameters (and any other parameters) that are required by the different parts and components of the containerized concrete batch plant 100 might be different from one another.

FIG. 4 shows a perspective view of the containerized concrete batch plant 100 with a knuckle crane (or knuckle boom crane) 110 in operation. In FIG. 4, the knuckle crane 110 holds a supersack 111 above one of the aggregate storage silos 108. According to one or more aspects, the knuckle crane 110 may also be operated for general use at a jobsite. The supersack 111 can contain any type of aggregate and can be emptied into one of the aggregate storage silos 108. According to one or more aspects, a lifting platform 113 is located under the knuckle crane 110. The lifting platform 113 is dimensioned, positioned, and/or configured to lift the knuckle crane 110. Lifting the knuckle crane 110 allows for longer reach outside the container 104 while assisting the knuckle crane 110 to avoid components and/or obstacles inside the container 104. According to one or more aspects, the lifting platform 113 is a hydraulic lifting platform 113. The knuckle crane 110 can connect or attach to any type of attachments (including grapples, grabs, forks, buckets, rotators, augers, magnets, and/or the like). The knuckle crane 110 uses the appropriate attachments to grab supersacks, aggregates located next to or around the container 104, and/or any other materials that need to be moved about the container 104 and/or the containerized concrete batch plant 100 and/or that need to be placed for holding by any of the hydraulically controlled support arms 124, further discussed below in the description of FIG. 7. According to one or more aspects, the knuckle crane 110 uses the appropriate attachments in operation for general use at a jobsite. The moving of supersacks, aggregates, and/or materials by the knuckle crane 110 includes dropping the aggregates and/or materials into any of the one or more aggregate storage silos 108 (including more than one of the one or more aggregate storage silos 108) and/or the two-shaft mixer 120. The moving of supersacks, aggregates, and/or materials by the knuckle crane 110 includes holding a supersack over any of the one or more aggregate storage silos 108 (including more than one of the one or more aggregate storage silos 108) and/or the two-shaft mixer 120.

Figure 6:
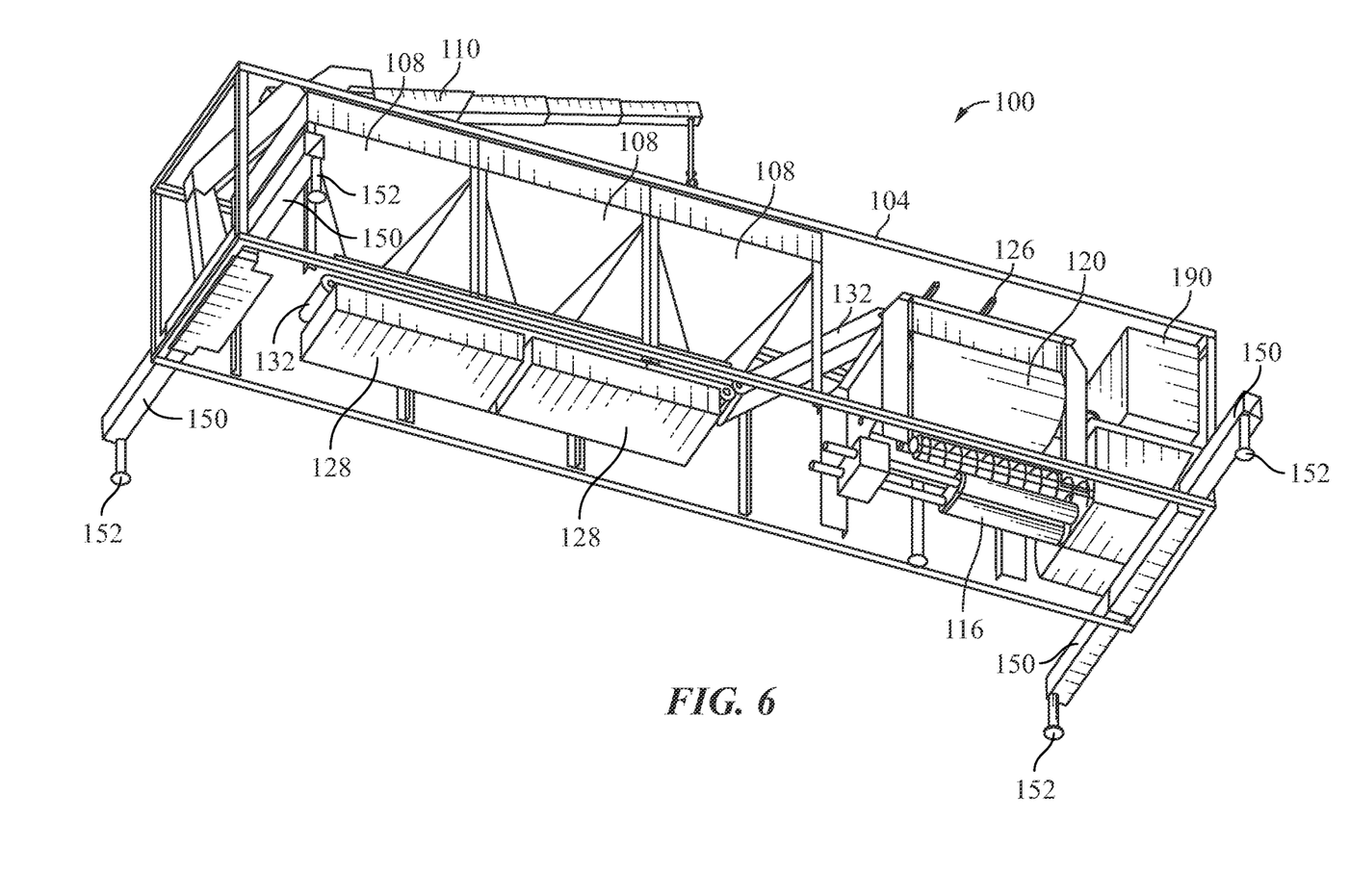
FIG. 6 illustrates an underside perspective view of the containerized concrete batch plant, according to some embodiments.

FIG. 5 and FIG. 6 illustrate the containerized concrete batch plant 100 in perspective views like FIG. 4, but in different angles and with stabilization outriggers 150 extending out of the container 104. FIG. 5 shows inside the hopper 105 by visually looking through the power plant 190, showing the concrete output hose 198. FIG. 6 shows the underside of the containerized concrete batch plant 100.

Each stabilization outrigger may be utilized (whether individually or in combination with one another) to hydraulically lift the containerized concrete batch plant 100 from a delivery truck, to level the containerized concrete batch plant 100 prior to and during use, and to stabilize the working load and/or moment created by the knuckle crane 110 and/or the working load and/or moment created when the concrete output hose 198 is filled with concrete and/or pumped. Each one of the stabilization outriggers 150 has one or more legs 152. Note that FIGS. 1, 3, 4, and 7 show the legs 152 directed upward so that, when each of the stabilization outriggers 150 is retracting into the container 104, the legs 152 do not hit the bottom of the container 152. In other words: (1) when the stabilizing outriggers 150 are completely inside the container 104, the one or more legs 152 are oriented upward; (2) when the stabilizing outriggers 152 expand outwards from completely inside the container 104, at some point the one or more legs 152 change their orientation from upward to downward; and (3) when the stabilizing outriggers 152 retract from their expanded configuration outside the container 104 to completely inside the container 104, at some point prior to the one or more legs 152 reaching the container 104, the one or more legs 152 change their orientation from downward to upward. To change the orientation of the one or more legs 152, each of the stabilization outriggers 152 rotates. According to one or more aspects, to change the direction of the legs 152, the legs 152 rotate about their corresponding stabilization outrigger 152. The one or more legs 152 extend from and/or retract into their corresponding stabilization outrigger 150 by manual adjustment and/or by using hydraulic mechanisms adapted to cause the required movements (expansion and/or retraction) of the one or more legs 152. In operation, the expansion and/or retraction of the one or more legs 152 allows the one or more legs 152 to adapt to uneven terrains with different elevations at the locations where the one or more legs 152 will be located. The length of the one or more legs 152 can be modified to accommodate for any terrain or any other operational needs. Furthermore, the one or more legs 152 enable the loading and unloading of the containerized concrete batch plant 100 from flatbed vehicular transport. When the flatbed vehicular transport has the containerized concrete batch plant 100 on its flatbed, the raising the containerized concrete batch plant 100 above the level of the flatbed with the one or more legs 152 allows the flatbed vehicular transport to pull away while leaving the concrete batch plant 100 in place. Likewise, to place the concrete batch plant 100 on a flatbed for transport, the one or more legs 152 raise the containerized concrete batch plant 100 above the level of the flatbed with the one or more legs 152, allowing the flatbed vehicular transport to move the flatbed under the containerized concrete batch plant 100.

To summarize, in storage position, the one or more legs 152 extend upwards from the stabilization outriggers 150. The stabilization outriggers 150 rotate when the stabilization outriggers 150 extend so that the one or more legs 152 extend downwards or in any convenient angle. According to one or more aspects, the stabilization outriggers are used to load/unload the containerized concrete batch plant 100 from a truck or trailer or transportation vehicle or vessel.

Figure 7:
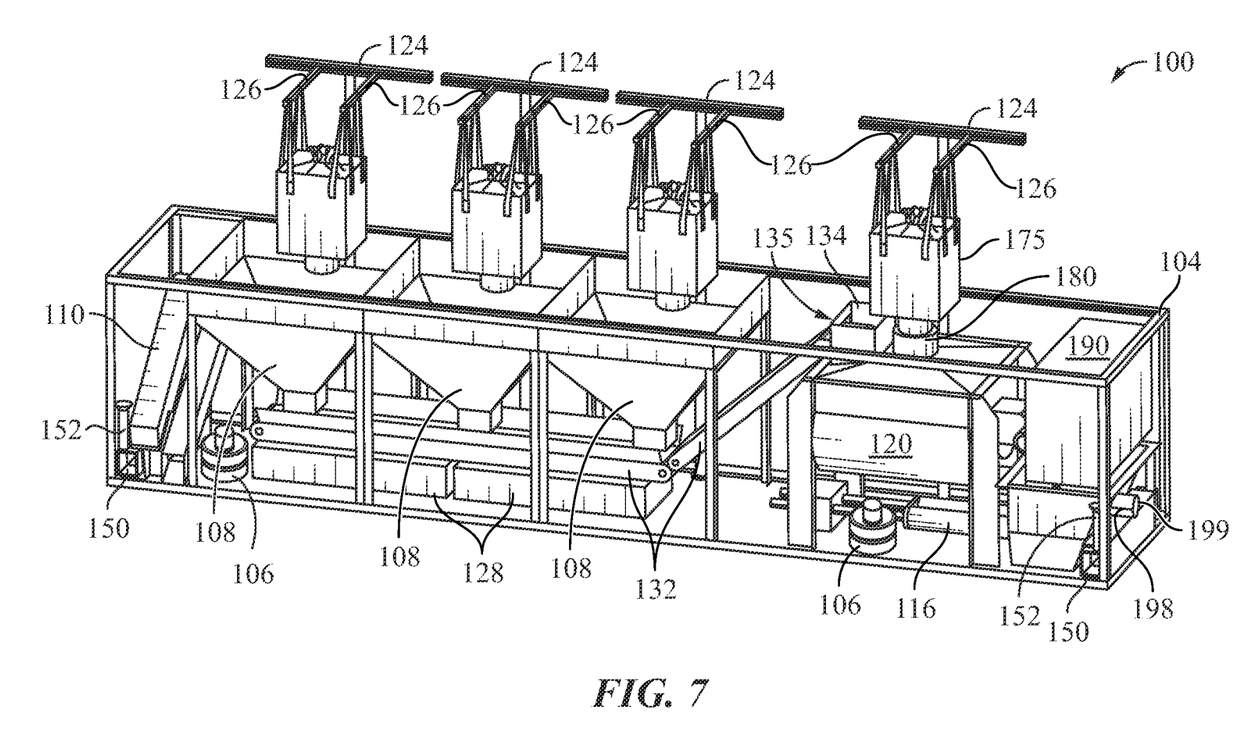
FIG. 7 illustrates a perspective view of the containerized concrete batch plant in an operational configuration, according to some embodiments.

FIG. 7 illustrates concrete batch plant 100 with a plurality hydraulically controlled support arms 124. There is one hydraulically controlled support arm 124 above each of the aggregate storage silos 108. Each one of the hydraulically controlled support arms 124 holds a supersack 175. There is also one hydraulically controlled support arm 124 above the two-shaft mixer 120. Each hydraulically controlled support arm 124 has one or more adjustable brackets 126 which are movable to fit the straps on a super sack. The supersack (containing inputs or ingredients) would be hung above each one of the aggregate storage silos 108 and/or the two-shaft mixer 120. According to one or more aspects, in operation, the supersack 175 above the silos would contain sand or gravel, and the supersack 175 above the two-shaft mixer 120 would contain Portland cement. Each hydraulically controlled support arm 124 has a scale that weighs the contents of the supersack 125. According to one or more aspects, each hydraulically controlled support arm 124 has a scale that weighs the contents of the supersack 125 in combination with, in addition to, and/or as an alternative to the of the deductive scales of the aggregate storage silos 108. The computer is connected to the scales of the plurality hydraulically controlled support arms 124 and to the deductive scales of the aggregate storage silos 108. The computer is configured to determine a supersack weight and/or a rate of ingredient delivery based on the average of the weights of the deductive scales, the average of the scales of the plurality of hydraulically controlled support arms, the various averages combined, the type of ingredient, and/or the properties of the ingredient (such as mass, weight, volume, form, density, volume density, friction coefficients, boiling point, melting point, state of matter such as solid or liquid, hardness, malleability, solubility, electrical conductivity or resistivity, color, reflectiveness, oxidation state, chemical and/or physical stability, and/or the like). The two-shaft mixer 120 has an upper opening 180 to which the supersack 175 connects to fluidly pour the ingredients into the two-shaft mixer 120. The upper opening 180 has a deductive scale similar to, equal to, or different from the deductive scales of the one or more aggregate storage silos 108. According to one or more aspects, the deductive scale of the upper opening 180 incorporates the features and characteristics of the deductive scale of the one or more aggregate storage silos 108. When the two-shaft mixer 120 is mixing materials, the upper opening 180 is shut closed by an actuator operated upper opening door (not shown) controlled by the computer, which avoids dust and/or materials from splattering out of the two-shaft mixer 120 during mixing operations.

The two-shaft mixer 120 may be fed inputs by various means, some of which have already been described above. The two-shaft mixer 120 may be fed inputs by the conveyor 132 or by a bag or supersack connected to the upper opening 180. The one or more aggregate storage silos 108 and/or the two-shaft mixer 120 may be fed on site by a front-end loader (not shown). The knuckle crane 110 may pour inputs into the one or more aggregate storage silos 108 and/or the two-shaft mixer 120.

Inputs and/or a bag with input(s) may be placed inside any of the belly tanks 128, with a first end of a tank-to-mixer hose (not shown) attached to a belly tank opening (not shown) of the corresponding belly tank 128. The second end of the tank-to mixer hose (not shown) is attached to the upper opening 180 or to another opening (not shown) of the two-shaft mixer 120. A blower or pump (not shown) blows or pumps the input from the corresponding belly tank 128 (or bag with input) to the two-shaft mixer 120 through the tank-to mixer hose (not shown).

Inputs and/or a bag with input(s) may be placed inside an outside tank (not shown), with a first end of an outside-tank-to-mixer hose (not shown) attached to an outside tank opening (not shown). The second end of the outside-tank-to mixer hose (not shown) is attached to the upper opening 180 or to another opening (not shown) of the two-shaft mixer 120. A blower or pump (not shown) blows or pumps the input from the outside tank (or bag with input) to the two-shaft mixer 120 through the outside-tank-to mixer hose (not shown).

Figure 8:
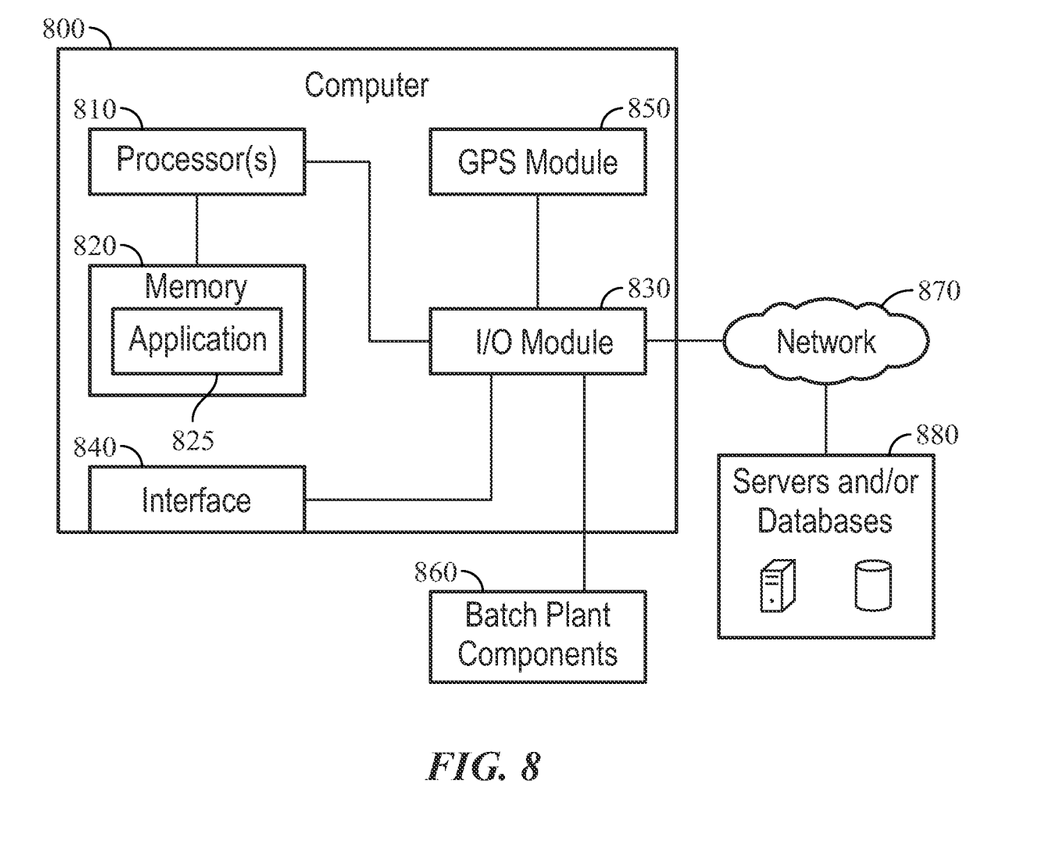
FIG. 8 illustrates a block diagram of a computer of the containerized concrete batch plant, according to some embodiments.

FIG. 8 illustrates a conceptual block diagram of a computer 800, according to one or more aspects. Various features described within FIG. 8 may generally complement the description of the other figures of the present disclosure, including without limitation the description of the computer and the aspects related to the computer as described above. Thus, the computer 800, and any contemplated or referred modifications and/or variations, may be the same or substantially similar to the computer discussed in the description of the other figures of the present disclosure. Likewise, the computer discussed in the description of the other figures of the present disclosure, and any contemplated or referred modifications and/or variations, may be the same or substantially similar to the computer 800. The computer 800 is configured to implement at least one aspect of the present disclosure described herein. The computer 800 activates and/or turns on one or more parts or components of the containerized concrete batch plant 100, runs diagnostics of the containerized concrete batch plant 100 and/or any of its parts or components, any of its subparts or subcomponents, and so forth. The computer communicates and sends diagnostic results, reports, and/or alerts to maintenance servers, maintenance databases, and/or maintenance clients (as further discussed below).

The computer 800 includes a processor(s) 810, a memory 820 storing an application 825, an input/output module (or I/O module) 830, an interface 840, and a positioning module (or GPS module) 850. The computer 800 may be a generic computing device, a dedicated computing device, a desktop computer, a laptop computer, a smartphone, a personal digital assistant (PDA), tablet computer, computer cluster, and/or any other type of computing device configured to receive input, process data, and optionally display images, and is suitable for practicing one or more aspects. The computer 800 described herein is illustrative and any other technically feasible configurations fall within the scope of the present disclosure. It will be apparent to those with ordinary skill in the art that FIG. 8, including its illustration and the description of its aspects herein can be modified in various ways while remaining within the scope of the aspects illustrated and/or described herein. For example, the computer 800 and/or any of its components may be implemented locally and/or remotely via wireless communications and/or internet communications, via servers, via cloud services, via multiple computers 800, and/or the like. The computing elements shown in computer 800 may correspond to a physical computing system (e.g., a local or networked computing device) or may be a virtual computing instance executing within a computing cloud. The computer 800 may be located in any available space or compartment in the container 104.

The processor(s) 810 may be any suitable processor implemented as a general purpose or dedicated processor, central processing unit (CPU), a graphics processing unit (GPU), an application-specific integrated circuit (ASIC), a field programmable gate array (FPGA), an artificial intelligence (AI) accelerator, dedicated and/or programmable microprocessor, programmable integrated circuit, programmable logic device, finite state machine, any other type of processing unit, a combination of different processing units (such as a CPU configured to operate in conjunction with a GPU), and/or any type of device capable of executing application programs including, without limitation, instructions associated with the memory 820, the application 825, the I/O module 830, the interface 840, the GPS module 850, and/or any of the components, parts, and/or aspects of the containerized concrete batch plant 800. The processor(s) 810 is wired and/or wirelessly connected to the memory 820 and the I/O module 830. According to one or more aspects, the processor(s) 810 is wired and/or wirelessly connected to the memory 820, the I/O module 830, the interface 840, and/or the GPS module 850.

Memory 820 includes a random-access memory (RAM) module, a flash memory unit, or any other type of memory unit or combination thereof. The processor(s) 810 and/or the I/O module 230 are configured to read data from and write data to memory 820. Memory 220 includes various software programs that can be executed by the processor(s) 810 and application data associated with said software programs, including software that runs methods, steps, and processes such as the software, methods, steps, and/or processes described in this disclosure, including those described for FIG. 9, below.

The I/O module 830 provides the hardware, firmware, and/or software for the computer 800 to interact with other components and devices, the interface 840, the GPS module 850, the batch plant components 860, the network 870, and/or the like.

The I/O module 830 is wired and/or wirelessly connected to and communicates back and forth with the interface 840. The interface 840 includes devices capable of providing input, such as a keyboard, a mouse, a touch-sensitive screen, a touchpad, a camera, a microphone, a headset, joystick controller, remote controllers, heavy machinery controllers, equipment controllers, and so forth, as well as devices capable of providing output, such as a display device, a speaker, a headphone, a headset, and so forth. Additionally, interface 840 may include devices capable of both receiving input and providing output, such as a touchscreen, a universal serial bus (USB) port, and so forth. Interface 840 may be configured to receive various types of input from a user of a containerized concrete batch plant (such as the containerized concrete batch plant 100), and to also provide various types of output to the user, such as displayed digital images, digital videos, sound, and/or text. In some embodiments, interface 840 is embedded and/or integrated with the control unit 200. For example, the computer 800 may have the interface 840 on the housing that encloses the computer 800.

The I/O module 830 is wired and/or wirelessly connected to and communicates back and forth with the GPS module 850. The GPS module 850 has the hardware, firmware, and/or software required to enable global positioning technologies and functionality. The GPS module 850 enables geolocation and/or other location indicating features or technologies to capture information indicating the location of the containerized concrete batch plant 100. According to one or more aspects, the GPS module 850 implements geolocation through satellite detection (such as GPS, GLONASS, Galileo, and/or the like), wireless telephonic systems, WiFP (WiFi Positioning System), and/or the like. Thus, the GPS module 850 is not limited to GPS technology.

The I/O module 830 is wired and/or wirelessly connected to and communicates back and forth with the batch plant components 860. The I/O module 830, via instructions from the application 825 executed by the processor(s) 810, requests, detects, receives, senses, and/or observes the operational status, functionality, malfunction, and/or activity of one or more of the batch plant components 860. The batch plant components 860 are the parts and components of the containerized concrete batch plant 100 that send, receive, and/or otherwise interact with the computer 800. For example, as described above, each one of the one or more aggregate storage silos 108 has a deductive scale, an output door, and a silo actuator that opens and/or closes the output door (not shown). Also described above, the computer uses deductive scaling to measure the weight and/or the amount of contents poured from the aggregate storage silos 108 onto the conveyor 132. All operational aspects regarding the one or more aggregate storage silos 108 (operating the deductive scale, controlling the silo actuator that opens and/or closes the output door, and so forth) are controlled by the computer 800 via the I/O module 830. Likewise, all operational aspects regarding any and all of the parts and components of the containerized concrete batch plant 100 described and/or contemplated herein are controlled by the computer 800 via the I/O module 830.

The I/O module 830 is wired and/or wirelessly connected to and communicates back and forth with the network 870. Furthermore, the I/O module 830 is wired and/or wirelessly connected to and communicates back and forth with the servers and/or databases 880 through the network 870. The network 870 includes any technically feasible type of communications network that allows data to be exchanged between the computer 800 and external entities or devices, such as a web server or other networked computing device. For example, network 870 may include a wide area network (WAN), a local area network (LAN), a wireless (WiFi) network, Bluetooth®, satellite communications, and/or the Internet, among others. According to one or more aspects, the I/O module 830 is not directly connected to one or more of the interface 840, the GPS module 850, and/or the batch plant components 860. According to one or more aspects, the I/O module 830 connects wirelessly to the interface 840, the GPS module 850, the batch plant components 860, and/or the servers and/or databases 880 through the network 870.

The servers and/or databases 880 include computers and/or servers, including client computers working in tandem with servers, virtual servers, cloud services, serverless computing architectures, containers, web apps, web functions, microservices, server and/or database warehouses and/or clusters, databases (relational, graphical, no-sql, centralized, distributed, object oriented, cloud, operational, key-value, hierarchical, ER model, document, and so forth), and/or the like. The servers and/or databases 880 that provide maintenance to the containerized concrete batch plant 100 are maintenance servers and/or maintenance databases. According to one or more aspects, the maintenance servers and/or maintenance databases track and/or record the functions, use, operational time, performance, production, malfunctions, repairs, tampering, location, and/or any other aspects of the containerized concrete batch plant 100 and/or any of its parts or components. In operation, the servers and/or databases 880 (including the maintenance servers and/or maintenance databases) communicate back and forth with the computer 800 and/or the I/O module 830 via the network 870. The databases of the servers and/or databases 880 store and service the stored information. The servers of the servers and/or databases 880 provide operational functionality for the aspects of the application 825 that require or involve communication with maintenance servers, maintenance databases, and/or maintenance clients. Maintenance clients are the local computers of employees and/or staff that service and provide support for the operation of the containerized concrete batch plant 100. Employees and/or staff, and their maintenance clients (local computers), may be close to the containerized concrete batch plant 100 or at another location, another city, or another country, at their offices, and so forth. The I/O module 830, via instructions from the application 825 executed by the processor(s) 810, sends information that is or was sent, received, determined, generated, and/or handled by the I/O module 830 and/or the computer 800 to maintenance servers, maintenance clients, and/or maintenance databases via the network 870.

In operation, the containerized concrete batch plant 100 may be operated locally and/or remotely. Inexperienced users may call or communicate with experienced users, training or maintenance, customer support staff, and/or the like, and share or transfer partial or total control over the application and/or the computer, whether locally and/or remotely. Similarly, employees and staff with the required authority may share or take partial or full control over the computer through their maintenance clients, whether locally and/or remotely. Furthermore, security mechanism may be installed physically and/or digitally in the computer. For example, if a containerized concrete batch plant 100 is misappropriated, taken to an unauthorized location, or should otherwise not be in operation, employees and/or staff may, through their maintenance clients, remotely send a shut-down signal to the computer. The shut-down signal causes the application and/or the computer to stop all operations of the containerized concrete batch plant 100, to activate any mechanical security measures, to upload all information and/or data to maintenance servers and/or maintenance databases, to delete all local memory storage of all information and/or data, to delete the application itself, to become disabled (until authorized personnel reactivate the computer), and/or the like.

Example Process

To enable the reader to obtain a clear understanding of the technological concepts described herein, the following process describes specific steps performed in a specific order. However, one or more of the steps of a particular process may be rearranged and/or omitted while remaining within the contemplated scope of the technology disclosed herein. One or more processes and/or steps thereof, may be combined, recombined, rearranged, omitted, or executed in parallel to create different process flows that are within the contemplated scope of the technology disclosed herein. While the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 9:
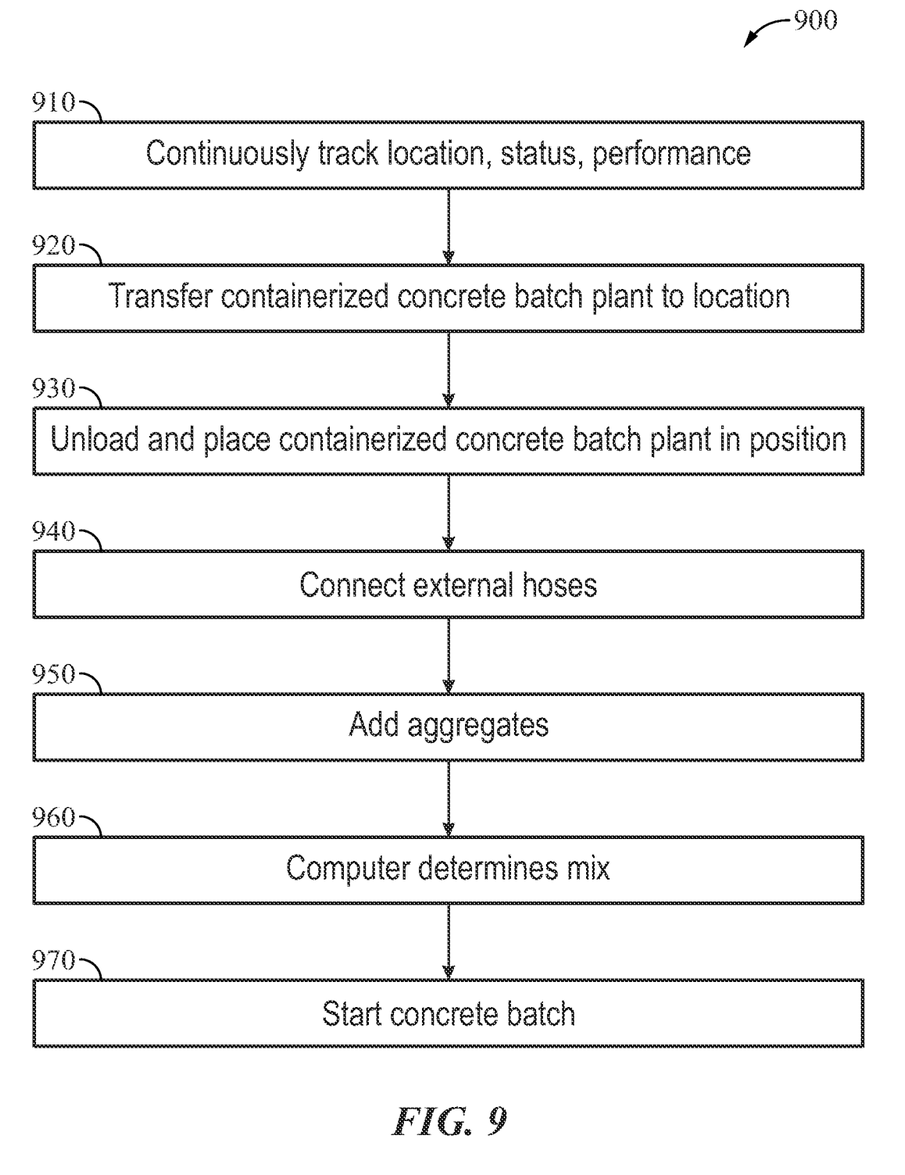
FIG. 9 illustrates a flow diagram of a process for producing concrete with the containerized concrete batch plant, according to some embodiments.

FIG. 9 is a flow diagram of an example process 900 of the operation of a containerized concrete batch plant including the containerized concrete batch plant 100. According to one or more aspects, the process begins at step 910, in which a maintenance client and/or a maintenance server track the location, status, and/or performance of a containerized concrete batch plant. According to one or more aspects, a maintenance client and/or a maintenance server track the location, status, and/or performance of a containerized concrete batch plant in tandem with and/or in communication (through a network such as the network 870) with a computer of the containerized concrete batch plant, wherein the computer (which incorporates the aspects of the computer 810) executes an application (which incorporates the characteristics of the application 825) to operate a GPS module (which incorporates the aspects of the GPS module 850) and/or an I/O module (which incorporates the aspects of the I/O module 830). Measuring performance includes measuring the amount of concrete output and/or the amounts of inputs into and/or out of aggregate storage silos and/or two-shaft mixer. Note that step 910 may be continuous, interrupted, periodic, and/or the like, and may stop and restart between or parallel to any other step.

Next, in step 920, a vehicle, vessel, or other transport transfers the containerized concrete batch plant to the desired location. To place the containerized concrete batch plant at the desired operational position, the process 900 moves on to step 930, where the containerized concrete batch plant lifts over a transport flatbed with stabilization outriggers as described above. Other means of moving a container of the containerized concrete batch plant (such as container 104) will be apparent to those skilled in the arts.

Next, in step 940, one or more users connect external hoses to the containerized concrete batch plant, including any hoses to be connected to the referred two-shaft mixer (which incorporates the aspects of the two-shaft mixer 120). Any other initial operational steps, such as choosing and enabling a power source, running initial diagnostics, engaging in an ocular inspection of all parts and components of the containerized concrete batch plant, and/or the like, are performed at this point.

Next, in step 950, aggregates are added and/or placed in position for operation. In this regard, steps 940 and 950 may overlap, as certain hoses may be connected for initial operation in step 940 which would enable the consumption of inputs by the containerized concrete batch plant in operation for transferring inputs into the two-shaft mixer. For example, connecting a first end of an outside-tank-to-mixer hose to an outside tank and connecting a second end of the outside-tank-to mixer hose to the two-shaft mixer, as discussed above, may be contemplated as part of step 940 and/or 950.

Then, in step 960, users input to the computer parameters for the computer to determine the appropriate engineered mix design. According to one or more aspects, users input, via remote, internet, and/or satellite communications, one or more engineered mix designs, parameters for determining the appropriate engineered mix design, and/or instructions and/or formulas and/or code executable for determining the appropriate engineered mix design. The application performs the determination of the engineered mix design according to aspects, conditions, and/or parameters well known to those skilled in the art. The computer uses the engineered mix design to generate batching program information. The batching program information is used by the application to determine how to control the different aspects, parts, and/or components of the containerized concrete batch plant.

After step 960, the containerized concrete batch plant is ready to commence mixing inputs and outputting concrete. The process 900 moves to step 970, where the computer starts a concrete batch automatically and/or after a command input from a user in order to generate concrete.

Note that the various steps of process 900, or at least the steps that do not require physical human intervention for the operation of the containerized concrete batch plant 100, may be performed remotely, under remote observation, under remote control, and/or the like. For example, in step 930, where the containerized concrete batch plant lifts over a transport flatbed with stabilization outriggers, a user may inform a remote operator who may have a remote computer with a local version of the application running and may use the remote computer to send (via satellite, internet, and so forth, including any applicable communication means discussed herein) a remote operation signal to the computer of the containerized concrete batch plant to lift through the stabilization outriggers.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A containerized concrete batch plant, comprising:
   a container configured to contain a concrete batch plant to permit the transportation of the concrete batch plant, wherein the container includes opposed ends and structural support members extending along each edge of the container to a top of the container to support a plurality of panels to enclose the container, and wherein the concrete batch plant comprising one or more storage silos to receive a plurality of concrete elements for transfer to a mixer;
   a knuckle crane disposed in the container, wherein the knuckle crane is configurable between a folded position and a deployed position, wherein the folded position allows the knuckle crane to fit within a four sided sub-compartment of the container, a wherein the knuckle crane is to lift a supersack containing one or more of the plurality of concrete elements, and wherein the sub-compartment is defined between one of the storage silos, a group of the structural support members, the top of the container, and a said opposed end of the container;
   a lifting platform under the knuckle crane, wherein the lifting platform is to lift the knuckle crane above the container to deploy the knuckle crane into a space larger than the sub-compartment to convert the knuckle crane between the folded position and the deployed position and to avoid components inside the container to increase the reach of the knuckle crane along the top of the container;
   a hopper to receive concrete from the mixer; and
   a concrete pump to pump the concrete out of the hopper.

2. The containerized concrete batch plant of claim 1, wherein the one or more storage silos pour concrete elements on a conveyor to transfer the plurality of concrete elements to the mixer.

3. The containerized concrete batch plant of claim 1, wherein the mixer is a two-shaft mixer.

4. The containerized concrete batch plant of claim 1, the concrete batch plant further comprising a geolocation module.

5. The containerized concrete batch plant of claim 4, wherein the concrete batch plant further comprises an auger of an auger fed hopper, the auger configured to transfer the concrete from the mixer to a hopper of the auger fed hopper and disposed within a housing having a removeable side plate to facilitate cleaning of the auger.

6. The containerized concrete batch plant of claim 1, wherein at least one of the one or more storage silos comprises a deductive scale.

7. The containerized concrete batch plant of claim 1, wherein the container comprises a plurality of wheels.

8. The containerized concrete batch plant of claim 1, wherein the container comprises a plurality of stabilization outriggers configured to extend out of the container.

9. The containerized concrete batch plant of claim 8, wherein each stabilization outrigger of the plurality of stabilization outriggers comprises a leg that is directed upward when the plurality of stabilization outriggers is completely inside the container, wherein each stabilization outrigger of the plurality of stabilization outriggers is configured to rotate when extended.

* * * * *